US010893091B2

(12) United States Patent
Andaz et al.

(10) Patent No.: US 10,893,091 B2
(45) Date of Patent: Jan. 12, 2021

(54) MANAGEMENT OF ASYNCHRONOUS CONTENT POST AND MEDIA FILE TRANSMISSIONS

(71) Applicant: Amazon Technologies, Inc., Seattle, WA (US)

(72) Inventors: Sohrab Andaz, Seattle, WA (US); Aditya Madduri Karanam, Redmond, WA (US); Rajendra Kumar Vippagunta, Issaquah, WA (US)

(73) Assignee: Amazon Technologies, Inc., Seattle, WA (US)

(*) Notice: Subject to any disclaimer, the term of this patent is extended or adjusted under 35 U.S.C. 154(b) by 98 days.

(21) Appl. No.: 16/393,672

(22) Filed: Apr. 24, 2019

(65) Prior Publication Data
US 2019/0253478 A1 Aug. 15, 2019

Related U.S. Application Data

(63) Continuation of application No. 15/192,888, filed on Jun. 24, 2016, now Pat. No. 10,277,663.

(51) Int. Cl.
H04L 29/08 (2006.01)
H04L 12/58 (2006.01)
H04L 29/06 (2006.01)

(52) U.S. Cl.
CPC ............ *H04L 67/06* (2013.01); *H04L 51/08* (2013.01); *H04L 51/10* (2013.01); *H04L 67/1097* (2013.01); *H04L 69/14* (2013.01)

(58) Field of Classification Search
CPC ..... H04L 67/06; H04L 67/1097; H04L 51/08; H04L 51/10
See application file for complete search history.

(56) References Cited

U.S. PATENT DOCUMENTS

| 6,738,881 | B1 | 5/2004 | Ollivier et al. |
| 7,359,972 | B2 | 4/2008 | Jorgensen |
| 8,356,100 | B2 | 1/2013 | Zhu et al. |
| 9,053,124 | B1 | 6/2015 | Dornquast |
| 9,317,185 | B2 | 4/2016 | Martin |
| 9,876,637 | B2 | 1/2018 | Gauda |
| 10,154,116 | B1 | 12/2018 | Bushkin et al. |
| 10,277,663 | B1 | 4/2019 | Andaz et al. |
| 2002/0156900 | A1 | 10/2002 | Marquette |
| 2004/0091116 | A1 | 5/2004 | Staddon |
| 2005/0175027 | A1 | 8/2005 | Miller et al. |
| 2005/0238040 | A1 | 10/2005 | Vitebsky et al. |
| 2007/0247395 | A1 | 10/2007 | Barraclough |

(Continued)

Primary Examiner — Suraj M Joshi
(74) Attorney, Agent, or Firm — Knobbe, Martens, Olson & Bear, LLP

(57) ABSTRACT

Features are provided for the asynchronous transmission of media files that are part of, or otherwise associated with, user-created content posts. The media file transmissions are asynchronous in nature because the media files are transmitted in parallel background processes while users continue creating content posts or performing other computing tasks. The client devices on which the media file transmissions are initiated can manage the establishment of connections to a network-accessible content management system, and also manage the continued transmission of the media files to the content management system while the users perform other tasks using the client devices.

20 Claims, 6 Drawing Sheets

(56) References Cited

U.S. PATENT DOCUMENTS

| | | |
|---|---|---|
| 2008/0285487 A1 | 11/2008 | Forslow |
| 2009/0037500 A1 | 2/2009 | Kirshenbaum |
| 2009/0180494 A1 | 7/2009 | Ren et al. |
| 2010/0095006 A1 | 4/2010 | Broadhurst et al. |
| 2012/0005224 A1 | 1/2012 | Ahrens et al. |
| 2012/0124219 A1 | 5/2012 | Zhu et al. |
| 2012/0317307 A1 | 12/2012 | Ravindran |
| 2012/0331091 A1 | 12/2012 | Tseng |
| 2013/0305039 A1 | 11/2013 | Gauda |
| 2014/0003421 A1 | 1/2014 | Alicherry |
| 2014/0020115 A1 | 1/2014 | Le Chevalier et al. |
| 2014/0055627 A1* | 2/2014 | Fujii .................. H04L 67/32 348/207.1 |
| 2014/0108643 A1 | 4/2014 | Hui |
| 2014/0237361 A1 | 8/2014 | Martin |
| 2014/0240753 A1 | 8/2014 | Anno et al. |
| 2015/0032771 A1* | 1/2015 | Berio .................. G06Q 50/01 707/769 |
| 2015/0095154 A1 | 4/2015 | Kannan |
| 2015/0178769 A1 | 6/2015 | Mirisola |
| 2015/0271233 A1 | 9/2015 | Bouazizi |
| 2016/0344832 A1 | 11/2016 | Kukreja et al. |
| 2016/0359957 A1* | 12/2016 | Laliberte ............ G06Q 30/0241 |
| 2017/0019347 A1 | 1/2017 | Al-banna et al. |
| 2017/0180412 A1 | 6/2017 | Mikulski |
| 2017/0230939 A1 | 8/2017 | Rudolf |
| 2017/0249659 A1 | 8/2017 | Shroff |
| 2017/0255675 A1 | 9/2017 | Chavan |
| 2017/0329857 A1 | 11/2017 | Klotz, Jr. |
| 2017/0359778 A1 | 12/2017 | Chen |

* cited by examiner

US 10,893,091 B2

MANAGEMENT OF ASYNCHRONOUS CONTENT POST AND MEDIA FILE TRANSMISSIONS

CROSS-REFERENCE TO RELATED APPLICATIONS

The present application claims priority to U.S. patent application Ser. No. 15/192,888, filed on Jun. 24, 2016, which is incorporated by reference herein.

BACKGROUND

Generally described, computing devices and communication networks can be utilized to exchange content and other information. In a common application, a computing device can generate content to be distributed to other computing devices via a communication network. For example, a user of a computing device, such as a personal computer, laptop computer, tablet computer, or smart phone, may use the computing device to create content, such as text, documents, audio recordings, video, images, animations, and the like. The content may be transmitted directly to other users' computing devices, or the content may be transmitted to a network-accessible content server for distribution to other users' computing devices.

In some scenarios, a user may generate content by entering text and attaching or transmitting media files related to the text in some way. For example, a user may create an email message with textual content in the body of the email, and images attached to the email. As another example, a user may create an article or post to be made available to other users via the Internet. The article or post may include textual content, and may also have images, videos, and the like embedded within the text or otherwise displayed along with the text.

From the perspective of a user generating content, a user experience can be defined in terms of the performance and latencies associated with creating the content, transmitting the content to server computing devices for distribution, or transmitting the content to other user computing devices. For example, content creation may be performed in a step-by-step process, with a user first creating the text portion of the content, then adding images to the content, and finally submitting the content for distribution by a content server. In this process, a user transmitting content to a content server may have a better experience when transmitting the content to the content server over a wired network connection or WiFi connection than when transmitting content over slower wireless networks, such as 3G/4G cellular networks.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
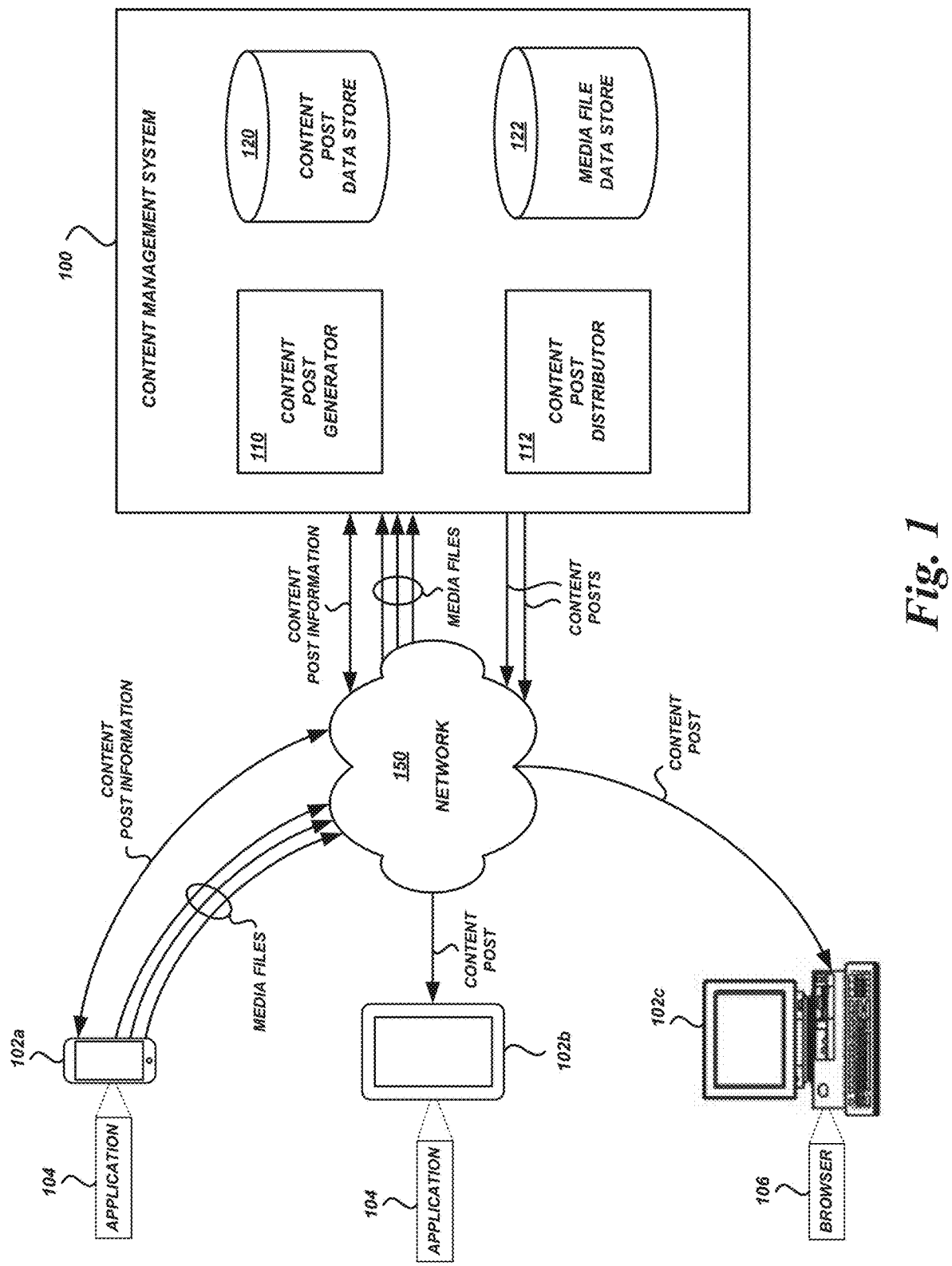
FIG. 1 is a block diagram of an illustrative computing environment including a content management system and various client devices according to some embodiments.

The present disclosure is directed to the asynchronous transmission of media files that are part of, or otherwise associated with, user-created content posts. The user-created content posts may be articles, reviews, weblog ("blog") posts, microblog posts, social media posts, email messages, network pages, documents, and other network-accessible content. Content posts may include various digital media content, such as images, videos, audio recordings, animations, executable files, and the like. Individual items of digital media content may be stored as media files, and the media files are transmitted to a content server so that they can be distributed to other client devices when the other client devices access the content posts. The media file transmissions are asynchronous in nature because the media files are transmitted in parallel background processes while users continue creating content posts or performing other computing tasks. To facilitate the asynchronous transmission of media files, the client devices on which the media file transmissions are initiated can manage the establishment of connections to content servers. The client devices can also manage the continued transmission of the media files to the content servers over the established connections while the users perform other tasks using the client devices. The content servers can verify the receipt of all media files associated with individual content posts, publish any completed content posts, and/or initiate error resolution for any incomplete content posts, all without requiring the users to wait for the tasks to complete before performing other computing operations. In this way, users may be provided with an improved experience when creating content posts with media files that would otherwise require long wait times for transmission to the content servers. The improved experience may be especially noticeable for users of mobile devices with low-bandwidth, high-latency wireless connections.

Some aspects of the present disclosure relate to specialized client-side processes for managing media file transmissions in connection with the creation of content posts. A user may use a client device to create a content post to be published on, or distributed by, a network-accessible content management system. When a user initiates a media file transmission in connection with a content post, the user's client device may establish a new connection with the content management system (or some other system or server) so that the media file may be transmitted in parallel with other network-based operations of the client device. In some embodiments, the client device may contact the content management system to request media file transmission information that is uniquely associated with the media file to be transmitted. For example, the media file transmission information may include the network address of a media file storage component of the content management system. The network address may include additional information (e.g., information added to the end of the network address, such as a query string) that identifies the media file to be transmitted, the content post to which the media file belongs, an expiration time for use of the network address, etc. The client device can establish a connection with the media file storage component at the network address. The client device may then transmit the media file to the media file storage component in a background process separate from the creation of the content post or other user-facing features of the client device. For content posts that have multiple media files, the process may be repeated as needed. Accordingly, the client device may establish multiple connections to the media file storage component (or to different media file storage components) and transmit multiple media files in parallel. In addition, the user may submit the content post to the content management system, browse content distributed by the content management system, and/or perform other operations that may or may not involve the creation or maintenance of network connections separate from the media file transmission connections.

Additional aspects of the present disclosure relate to specialized server-side processes for managing parallel transmission of media files and verifying that the media files have been transmitted properly and are ready to be published or otherwise distributed. The content management system can track each separate media file transmission that has been initiated in connection with a given content post. For example, the content management system may generate a unique, time-sensitive, single-use network address for each media file. When a client device begins transmitting a media file to one of the generated network addresses, the content management system can track the progress of the transmission and determine whether the transmission completed successfully. The verification process may be repeated, serially or in parallel, for other media file transmissions as needed. The content management system may then initiate a moderation or approval process for each media file that has been transmitted. For example, a workflow process may be initiated for human reviewers to review each media file (or some subset thereof) to determine whether the media files are appropriate for the context in which they will be published or otherwise distributed. As another example, the media files (or some subset thereof) may be analyzed by an automated, computer-implemented analysis component to determine whether the media files are appropriate. In some embodiments, if a media file fails to complete transmission or is determined to be inappropriate, the creator of the content post may be provided an opportunity to correct the issue (e.g., by re-transmitting the media item, transmitting an alternative item, removing the media item from the content post, etc.). In some embodiments, if a media file fails to complete transmission or is determined to be inappropriate, the content post may still be published. However, a placeholder may be used in place of the missing/inappropriate media file, or the content post may be re-formatted to exclude the missing/inappropriate media file.

Although aspects of some embodiments described in the disclosure will focus, for the purpose of illustration, on particular examples of client devices, content posts, and media files, the examples are illustrative only and are not intended to be limiting. In some embodiments, the techniques described herein may be applied to additional or alternative computing devices or content. In addition, although aspects of some embodiments described in the disclosure will focus, for the purpose of illustration, on certain sequences of events, in some embodiments media files may be received, validated, published, and otherwise processed in any order, sequentially or in parallel with each other and/or with the performance of other computing operations, etc. Furthermore, although aspects of some embodiments described in the disclosure will focus, for the purpose of illustration, on client-server architecture and interactions, in some embodiments other network architectures may be used (e.g., peer-to-peer), and devices referred to as "client devices" and "server devices" may also be referred to as "computing devices." Various aspects of the disclosure will now be described with regard to certain examples and embodiments, which are intended to illustrate but not limit the disclosure.

Network Environment

With reference to an illustrative embodiment, FIG. 1 shows a network environment in which aspects of the present disclosure may be implemented. As shown, the network environment may include a content management system 100 and various client devices 102a, 102b, and 102c (collectively "client devices 102"). The client devices 102 and content management system 100 may communicate with each other via one or more communication networks 150. A communication network 150 may be a publicly accessible network of linked networks, possibly operated by various distinct parties, such as the Internet. In other embodiments, the network 150 may include a private network, personal area network, local area network, wide area network, cable network, satellite network, cellular telephone network, etc. or a combination thereof, some or all of which may or may not have access to and/or from the Internet.

The content management system 100 may include various components for providing the features described herein. Illustratively, the content management system 100 may include a content post generator 110 to manage creation of content posts by users, receiving media files associated with the content posts, validation of content posts and media files, and the like. The content management system 100 may also include a content post distributor 112 to manage the distribution of content posts to various client devices 102 and other consumers of content from the content management system 100. The content management system 100 may also include various data stores to store data and/or files in connection with the content posts. For example, the content management system 100 may include a content post data store 120 to store information regarding content posts, textual content included in the content posts, information regarding any media files referenced by the content posts, etc. The content management system 100 may also include a media file data store 122 to store the media files that are transmitted in connection with content post generation.

The content management system 100 may be implemented on one or more physical server computing devices that provide computing services and resources to users. Illustratively, the content management system 100 (or individual components thereof, such as the content post generator 110 or content post distributor 112) may be implemented on one or more blade servers, midrange computing devices, mainframe computers, desktop computers, or any other computing device configured to provide computing services and resources. In some embodiments, the features and services provided by the content management system 100 may be implemented as web services consumable via the communication network 150. In further embodiments, the content management system 100 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a cloud computing environment.

The individual client devices 102 may be any of a wide variety of computing devices, including personal computing devices, terminal computing devices, laptop computing devices, tablet computing devices, electronic reader devices, mobile devices (e.g., smart phones, media players, handheld gaming devices, etc.), and various other electronic devices and appliances. A user may operate a client device 102 to access and generate content posts managed by the content management system 100. In some embodiments, a user may launch specialized application software, such as a mobile application 104 executing on a particular client device, such as a smart phone 102a or tablet computer 102b. The application 104 may be specifically designed to interface with the content management system 100 for generating and accessing content posts. In some embodiments, a user may use other application software, such as a browser application 106, to interact with the content management system 100.

When a user uses a client device 102a to create a content post, the client device 102a may exchange content post information regarding the post with the content management system 100 via the network 150. For example, as described in greater detail below, the client device 102a may communicate with the content post generator 110 during creation of the content post. The content post generator 110 may store information regarding the post in the content post data store 120. In connection with generation of the content post, the client device 102a may establish one or more additional connections with the content management system 100 via the network 150. The client device 102a may then transmit media files to the content management system 100 using the additional connections, and the content management system 100 may store the media files in the media file data store 122. Illustratively, the client device 102a may initiate the transmission of media files to the content management system 100 during creation of the content post. However, before the media files have been completely transmitted to the content management system 100, the user may complete and submit the post for distribution by the content management system 100. Even though one or more of the media files may not have completed transmitting, the application 104 may permit the user to view other content posts, generate additional content posts, and/or perform other computing operations while the media files finish transmitting in the background. After the media files for the content post have finished transmitting, the content management system 100 may distribute the content post or make the content post available for distribution. For example, the content post may be transmitted to other client devices 102b, 102c via the communication network 150.

Content Post Generation Process

Figure 2:
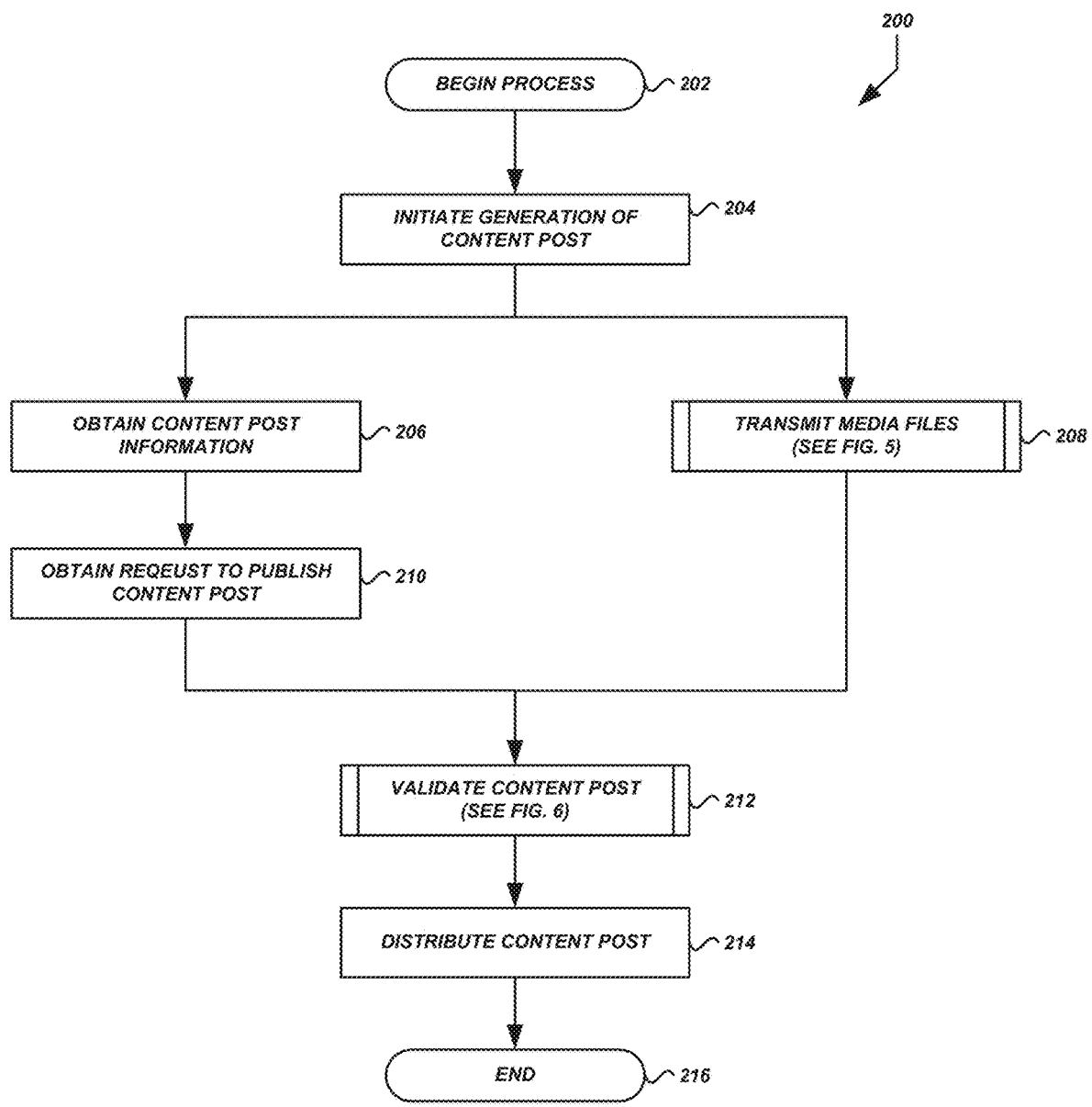
FIG. 2 is a flow diagram of an illustrative process for managing content post creation and asynchronous transmission of media files according to some embodiments.

FIG. 2 is a flow diagram of an illustrative process 200 for generating a content post and transmitting media files that are associated with the content post. A client device 102 and content management system 100 performing the process 200 may advantageously permit a user to continue creating the content post, submit the content post for distribution, and/or perform other computing operations, all while media files associated with the content post are transmitted in one or more parallel background processes.

Figure 3C:
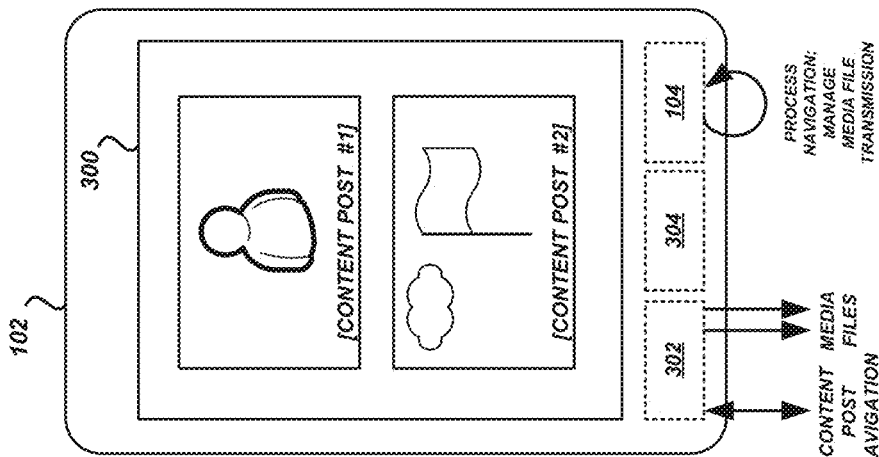
FIGS. 3A, 3B, and 3C show an illustrative client device during asynchronous transmission of media files according to some embodiments.
Figure 3B:
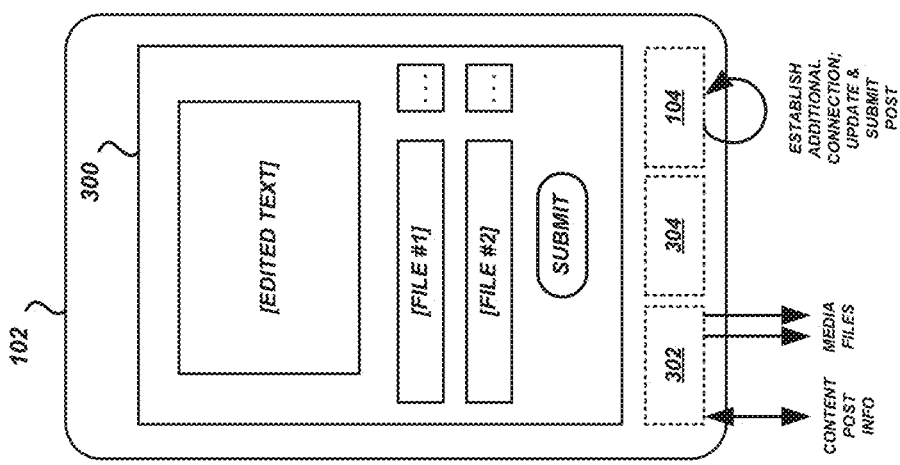
Figure 3A:
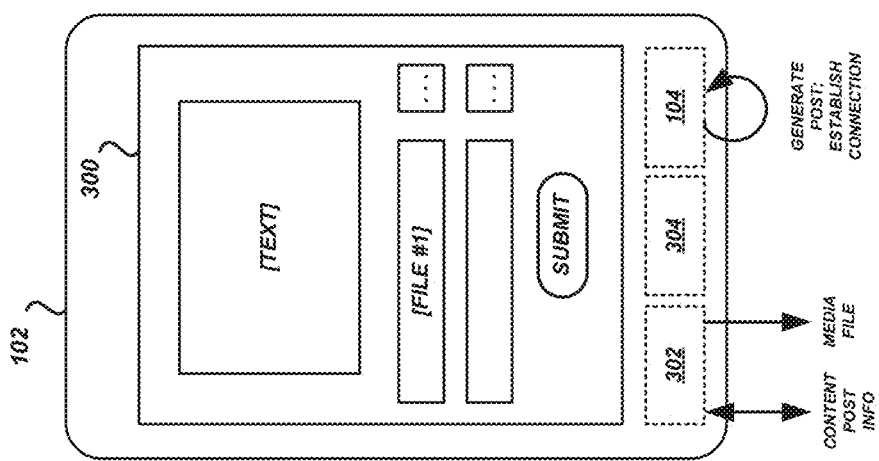

The process 200 will be described with reference to FIGS. 3A-3C, which show an example client device 102 at various stages during the process 200. The client device 102 shown in FIGS. 3A-3C includes a display 300 (e.g., a touchscreen video display, an e-ink display, etc.), a communication interface 302 (e.g., a modem, a network interface card or "NIC," etc.) and a processor (e.g., a hardware-based central processing unit or "CPU"). The communication interface 302 can establish network connections and exchange data with other computing devices via a network 150. The processor 304 can execute instructions of the operating system and/or applications, such as the application 104. Although the illustrative client device 102 is shown as having a single display 300, a single communication interface 302, and a single processor 304, in some embodiments a client device 102 may have one or more displays 300, communication interfaces 302, and/or processors 304.

The process 200 begins at block 202. The process 200 may begin in response to a user-initiated event on a client device 102. For example, the client device 102 may have an application 104 available for execution. When a user accesses the application 104, a set of executable program instructions stored on one or more non-transitory computer-readable media (e.g., hard drive, flash memory, removable media, etc.) may be loaded into memory (e.g., random access memory or "RAM") and executed by one or more processors 304 of the client device 102. Various operations performed by the client device 102 may also cause one or more processors of the content management system 100 to execute a set of executable program instructions to carry out the server-side portions of process 200. For example, when a user launches the application 104 on the client device 102, the set of executable instructions on the client device 102 may program the processor 304 to initiate communication with the content management system 100 via the communication interface 302. In response to the communications from the client device 102, the content management system 100 may perform the server-side portions of the process 200.

At block 204, the application 104 may initiate generation of a content post. For example, the application 104 may be executed by the processor 304 and may cause display of a user interface on the display 300 of the client device 102. The user of the client device 102 can interact with the user interface to generate the content post. The application 104 can manage generation of the post, such as by causing content post information to be transmitted by the communication interface 302 to the content management system 100. Illustratively, the content post may include text and/or various digital media content items. A digital media content item may be attached to the content post as a separate file (e.g., a file that will be linked from the content post), embedded within the content post (e.g., displayed or otherwise presented within the content post), etc.

At block 206, the application 104 may receive information regarding the content post, and may provide content post information to the content management system 100. For example, as shown in FIG. 3A, a user may enter textual information into the content post user interface of the application 104. The application 104 may cause the textual information to be transmitted to the content management system 100 by the communication interface 302. The content generator 110 may store the text or other content post information in the content post data store 120.

Figure 5:
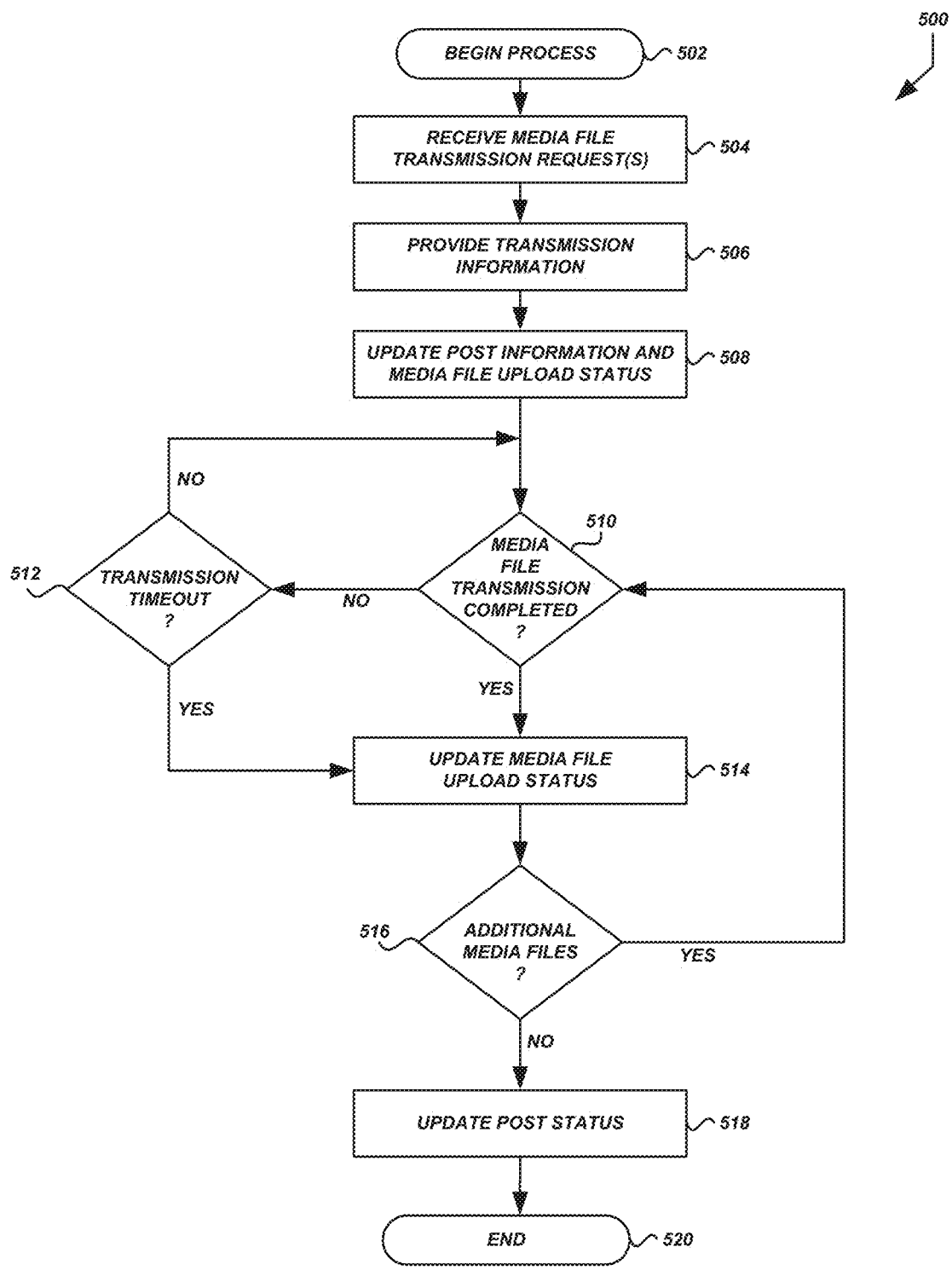
FIG. 5 is a flow diagram of an illustrative process for managing asynchronous transmission of media files according to some embodiments.

At block 208, the application 104 may initiate the transmission of one or more media files to the content management system 100. Such a transmission to the content management system 100 may also be referred to as an "upload" of media files. As shown in FIG. 3A, a user may select a file in the content post user interface of the application 104. The application 104 may cause the communication interface 302 to establish an additional connection with the content management system 100 so that the selected media file may be transmitted in parallel with the performance of other network operations, such as exchanging other information with the content post generator 110 regarding the content post. In some embodiments, a media file may be separated into multiple parts, and the parts may be submitted serially or in parallel, and reassembled at the content management system 100 into a single media file. For example, a video file may be segmented into multiple portions or "chunks." The portions may be submitted serially over a single network connection, or in parallel over multiple network connections. In some embodiments, media files or portions thereof may be compressed or otherwise encoded before or during transmission to reduce the total bandwidth required to transmit the media files. An example process 500 for managing the transmission of media files to the content management system 100 is shown in FIG. 5 and discussed in greater detail below.

As shown in FIG. 2, the transmission of the media file at block 208 may occur in parallel with other computing operations, such as continuing to prepare the content post at block 206 as described above, obtaining a request to publish the content post at block 210 as described below, etc. At some later time, the user may select an additional file in the content post user interface of the application 104, as shown in FIG. 3B. For example, the user may select the additional file before or after editing text or other information associated with the content post. The application 104 may cause the communication interface 302 to establish yet another connection with the content management system 100 to transmit the second media file in parallel with the first media file. In some embodiments, the second media file may not be transmitted using a separate connection than the connection used to transmit the first media file. For example, the second media file may be transmitted over the same connection as the first media file, sequentially after the first media file is transmitted. As another example, the two files may be transmitted over a single connection in an interleaved manner.

At block 210, the application 104 may receive a request to publish the content post, and may cause the communication interface 302 to transmit the request to the content management system 100. For example, as shown in FIG. 3B, the application 104 may submit the content post after a user activates the "Submit" button or issues some other command. The request to publish the content post may be submitted to the content management system 100 even before all of the media files have been completely transmitted to the content management system 100. In this case, the application 104 can continue to manage the transmitting of the media files via the communication interface 302, even after the user has begun browsing other posted content as shown in FIG. 3C. The content management system 100 can update information about the content post in the content post data store 120, and continue to receive the media file transmissions for storage in the media file data store 122.

Figure 6:
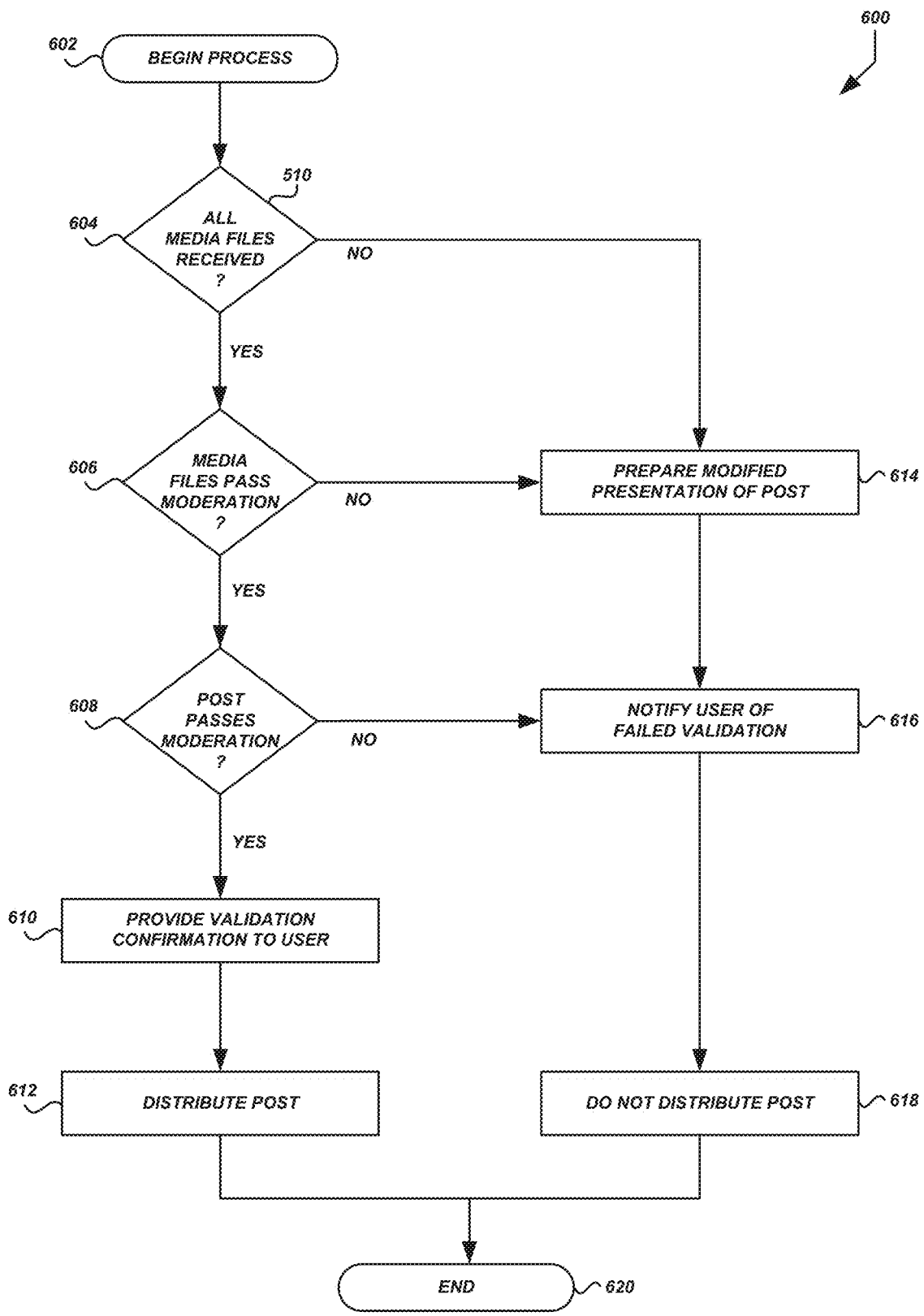
FIG. 6 is a flow diagram of an illustrative process for validating media files and content posts according to some embodiments.

At block 212, content post generator 110 or some other module or component of the content management system 100 may validate the content post to determine whether it is ready to be "published" (e.g., ready to be made available for distribution to other client devices). In some embodiments, validation of the content post includes determining whether all media files associated with the content post have been transmitted to the content management system successfully. Validation may also include determining whether the media files are appropriate for distribution, are legally able to be distributed, or otherwise satisfy the policies that the content management system 100 has implemented for distributing content. For example, the content post in general, and the media files in particular, may be moderated to determine whether they relate to illegal activity or behavior that may not be appropriate for the potential audience of the content post. An example process 600 for validating content posts is shown in FIG. 6 and described in greater detail below.

At block 214, the content post distributor 112 or some other module or component of the content management system 100 may make the content post available for distribution. In some embodiments, the content management system 100 may publish the content post to a new or existing network page or network address. In some embodiments, the content management system 100 may make the content post available to content feeds, such as social media feeds.

Data Flows and Interactions during Content Post Generation

Figure 4:
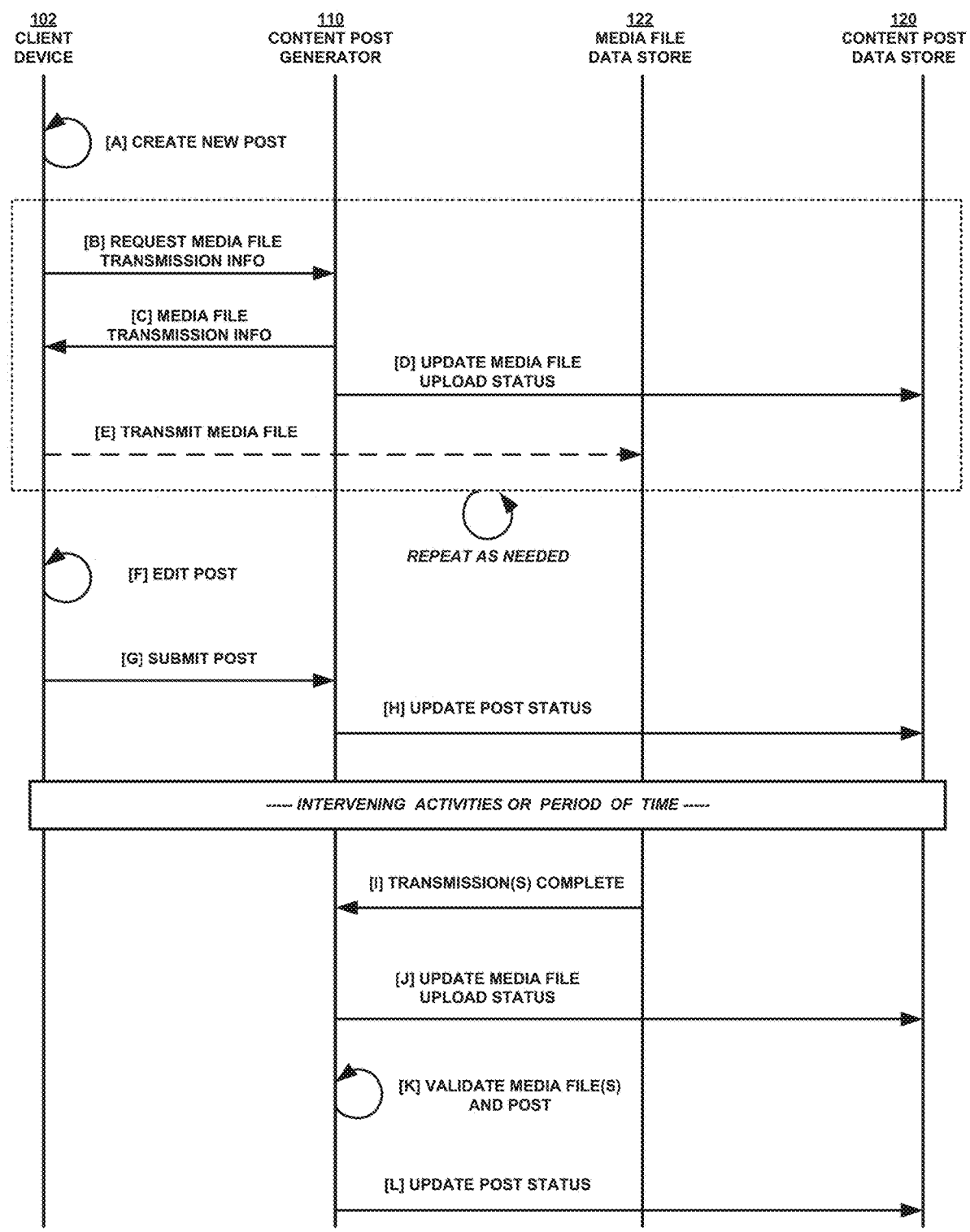
FIG. 4 is a diagram of illustrative communications and data flows between a client device and various components of a content management system according to some embodiments.

FIG. 4 is a diagram of illustrative data flows and interactions that may occur between a client device 102, content post generator 110, media file data store 122, and content post data store 120. The data flows and interactions shown in FIG. 4 may occur during the process 200 described above, and will be described in conjunction with the process 500 shown in FIG. 5 for managing the transmission or "upload" of media files to the content management system 100, and the process 600 shown in FIG. 6 for validating a content post.

When generation of a content post is initiated on a client device 102, the client device 102 may generate information regarding the content post at [A]. For example, the information regarding the content post may include information identifying the user, application 104, and/or client device 102, metadata regarding the content post, text entered by the user, and the like. At [B], the application 104 may add a media file to the content post and begin the process of transmitting the media file to the content management system 100. For example, the application 104 may request media file transmission information from the content post generator 110. The application 104 may provide an identifier of the content post with the request, such as an identifier generated at [A]. The identifier of the content post can allow the content post generator 110 to track the media file transmission in relation to the content post, and to later match the transmitted media file to the content post when the content post is eventually submitted. An example process 500 that may be performed by a content management system 100 for managing the transmission of one or more media files is shown in FIG. 5.

The process 500 shown in FIG. 5 begins at block 502. The process 500 may be performed in accordance with a set of executable program instructions stored on one or more non-transitory computer-readable media (e.g., hard drive, flash memory, removable media, etc.) of one or more server computing devices of the content management system 100. For example, the content post generator 110 may be implemented on a particular server or on a group of servers, and the set of executable instructions may be stored such that it is accessible to the servers. The set of executable program instructions may be loaded into memory (e.g., random access memory or "RAM") and executed by one or more processors of the server computing device(s) on which the content post generator 110 is implemented.

At block 504, the content post generator 110 or some other module or component of the content management system 100 can receive a media file transmission request from a client device 102, as shown in FIG. 4 at [B]. The media file transmission request may include information identifying the media file to be transmitted, the content post for which the media file is being transmitted, and the like. The request may be received via a connection that was previously established with the client device 102, such as the connection used in connection with initiating generation of the content post.

At block 506, the content post generator 110 or some other module or component of the content management system 100 may generate and send media file transmission information to the client device 102, as shown in FIG. 4 at [C]. Illustratively, the media file transmission information may include a network address of a location to which the media file is to be transmitted and, optionally, information uniquely identifying the media file (e.g., identification codes for the user, content post, client device 102, application 104, and/or media file). In some embodiments, the media file transmission information may be in the form of a uniform resource identifier ("URI") that includes a string of characters used to identify a resource in a network, e.g., by network address. In some embodiments, the URI is a uniform resource locator ("URL") that includes a network address with additional information appended onto the end. For example, the URL may include a network address of the media file data store 122 (or some component that stores media files in the media file data store 122), with an appended query string or other parameters that identify the user, content post, client device 102, application 104, media file name, media file type, media file subtype, some combination thereof, etc. In some embodiments, the media file transmission information may be secure, single-use, and/or time-sensitive media file transmission information. For example, the URL of the media file transmission information may have an expiration date and/or time encoded in the appended parameters. If the client device 102 (or any other device) attempts to transmit a media file to such a URL after it has already been used or has expired, the transmission may be rejected.

At block 508, the content post generator 110 or some other module or component of the content management system 100 may update information regarding the post in the content post data store 120. The information may be updated to reflect the addition of the media file to the current content post, the upload status of the media file (e.g., "not yet received"), etc., as shown in FIG. 4 at [D]. For example, information may be added to indicate that the content post has a pending media file.

The application 104 may then cause the communication interface 302 to establish a network connection to a server at the address specified in the media file transmission information, and begin transmitting the media file at [E]. As shown, the data flows and interactions labeled [B] through [E] may be repeated as needed for each additional media file that is added to the content post. For example, the content post generator 110 may receive another request to add a second media file to a content post. The content post generator 110 may generate second media file transmission information, including a second URL with appended data that uniquely identifies the second media file and that may or may not have a different expiration date or time than the first media file transmission information. The address portion of the second URL (e.g., the portion of the URL that identifies a domain name, top level domain, and directory structure without the appended query string or other parameters) may be the same as—or different from—the URL of the first media file transmission information.

At decision block 510, the content post generator 110 or some other module or component of the content management system 100 may determine whether the media file transmission has completed. If so, the process 500 may proceed to block 514. Otherwise, if the media file has not yet been completely transmitted, the process 500 may proceed to decision block 512. In some embodiments, the content post generator 110 may proactively monitor the upload status of the media file, such as by monitoring the connection with the client device 102 or monitoring the media file data store 122 to determine whether the file has been completely transmitted. In some embodiments, the media file data store 122 or some other module or component of the content management system 100 may generate a notification, as shown in FIG. 4 at [I], when the media file has either been completely transmitted or has failed. The content post generator 110 may receive and use the notification to make the determination at decision block 510 regarding which branch of execution to take.

At decision block 512, if the media file has not yet been transmitted successfully, the content post generator 110 or some other module or component of the content management system 100 can determine whether the transmission has timed out. A timeout may be implemented for a variety of reasons, including triggering cleanup of content posts and transmissions that have been abandoned and will not be published, identifying problems and implementing corrective action in a timely manner, freeing up inactive computing resources, and the like. In some embodiments, the timeout may be set to a period of time (e.g., a number of seconds, minutes, or hours) after which a notification can be triggered if the media file has not been transmitted successfully. The content post generator 110 can receive and use the notification to make the determination at decision block 510 to continue waiting for transmission of the file to complete, or to proceed to block 514.

At block 514, the content post generator 110 or some other module or component of the content management system 100 can update the media file and upload status information associated with the media file, as shown in FIG. 4 at [J]. If the media file has been transmitted successfully, the status may be updated to reflect an "upload complete" status. If the media file has timed out or otherwise will not be transmitted, the status may be updated to reflect the "timeout" or "error" status. As shown in FIG. 4 at [K], the content post generator 110 may initiate validation and/or moderation for media files that have been transmitted successfully, and the content post generator 110 may initiate error reporting and/or resolution for the media files that have not been transmitted successfully. An example process for validating content posts, including validation, moderation, error reporting, and/or error resolution for media files and content posts in general is shown in FIG. 6 and described in greater detail below.

At decision block 516, the content post generator 110 or some other module or component of the content management system 100 can determine whether there are additional media files to be transmitted for the current content post. If so, the process 500 may return to decision block 510 for each additional file. Otherwise, if there are no additional media files to be transmitted for the current post, the process 500 may proceed to block 518.

At block 518, the content post generator 110 or some other module or component of the content management system 100 can update the status of the post, as shown in FIG. 4 at [L]. If all files have been transmitted successfully and the post has been validated, the post status in the content post data store 120 may be updated to indicate that the post is ready to be distributed to other client devices. Otherwise, if the post has not been validated, the post status in the content post data store 120 may be updated to indicate that the post is not to be distributed, or the information regarding the post may be removed from the content post data store 120.

Returning to FIG. 4, the data flows and interactions labeled [B] through [E] may be performed as needed for each media file that is to be transmitted for a content post. In addition, the data flows and interactions labeled [B] through [E] may be performed before, after, or in parallel with other data flows and interactions. For example, a user may edit a content post after one or more media file transmissions have been initiated but before all media file transmissions complete successfully. The edit to the post (e.g., updated text) may be processed by the client device 102 at [G]. In some embodiments, the user may edit a content post offline, either before or after transmission of any media files associated with the content post has completed. When the user re-connects to the content management system 100 and submits the content post, the content post may then be validated and reconciled with its associated media files. As another example, a user may submit a content post at [G] to be published or distributed to other client devices before transmission of associated media files has completed. The content post generator 110 may then update the post information in the content post data store 120 at [J] to indicate that the post is ready for validation, even though media files have not all been transmitted yet. The user may then proceed to access other portions of the application 104, create or edit other content posts, or even stop using the application 104 altogether, and the associated media files may continue to be transmitted in the background.

An example process 600 for validating a content post is shown in FIG. 6. The process 600 begins at block 602. The process 600 may be performed in accordance with a set of executable program instructions stored on one or more non-transitory computer-readable media (e.g., hard drive, flash memory, removable media, etc.) of one or more server computing devices of the content management system 100. The set of executable program instructions may be loaded into memory (e.g., random access memory or "RAM") and executed by one or more processors of the server computing device(s) on which the content post generator 110 is implemented.

At decision block 604, the content post generator 110 or some other module or component of the content management system 100 can determine whether all media files for the current content post have been received. As described above, the upload status of each media file associated with the current content post may be indicated in content post information stored in the content post data store 120. The content post generator 110 may inspect the content post information and identify the media files associated with the current content post, and then determine whether each file has a status of "received," "uploaded," or some equivalent. Alternatively, the information regarding the content post itself may indicate whether all associated media files have been transmitted successfully. If all files have been transmitted successfully, the process 600 may proceed to decision block 606. Otherwise, if one or more media files have not been transmitted successfully, the process may proceed to block 614.

At decision block 606, the content post generator 110 or some other module or component of the content management system 100 can determine whether the media files have passed moderation or are otherwise appropriate for distribution to other client devices. For example, the content management system 100 may implement moderation guidelines regarding the content of media files associated with content posts. A workflow process for human moderators may be used to implement the guidelines. When a media file has been successfully transmitted, the workflow process may be initiated so that a human can review the media file and determine the degree to which the file meets the guidelines regarding the content of media files. In some embodiments, the workflow process for media files may not be initiated until all media files for a content post have been successfully transmitted. In some embodiments, automated analysis may be performed by computing systems instead of, or in addition to, the moderation by humans. If a media file does not satisfy the moderation guidelines of the content management system 100, the process 600 can proceed to block 614, described below. Otherwise, if the media files for the current content post have all satisfied the moderation guidelines, the process 600 may proceed to decision block 608.

At decision block 608, the content post generator 110 or some other module or component of the content management system 100 can determine whether the content post has passed moderation or is otherwise appropriate for distribution to other client devices. As with media files, described above, the content management system 100 may implement moderation guidelines regarding the content of content posts. When a content post has been submitted for distribution, a workflow process may be initiated so that a human can review the content post (e.g., the text of the post) and determine the degree to which the post meets the guidelines regarding the content of content posts. In some embodiments, the workflow process for a content post may not be initiated until all media files for the content post have been successfully transmitted, and a human moderator may review the content post and all associated media files together. In some embodiments, automated analysis may be performed by computing systems instead of, or in addition to, the moderation by humans. If a content post does not satisfy the moderation guidelines of the content management system 100, the process 600 can proceed to block 616, described below. Otherwise, if the current content post has all satisfied the moderation guidelines, the process 600 may proceed to block 610.

At block 610, the content post generator 110 or some other module or component of the content management system 100 can notify the creator of the content post that the content post has been successfully validated and will be made available for distribution.

At block 612, the content post generator 110 or some other module or component of the content management system 100 can make the post available for distribution by the content post distributor 112. Distribution of the content post may include distributing the post to other client devices or otherwise making the content post available to be accessed by other client devices. For example, the content post may be marked as available to be included in a feed of content posts presented on other client devices.

At block 614, if one or more media files have not been transmitted or have not passed moderation, a modified presentation of the content post may be prepared. Rather than refrain from distributing a content post due to the failure of a media file to pass moderation or be transmitted successfully, the content post may be modified so that the post is still presented without the media file. In some embodiments, the content post may be automatically reformatted so that viewers may not know that a media file is missing. In some embodiments, the content post may be presented substantially as originally generated, with a placeholder for the missing media file.

At block 616, the content post generator 110 or some other module or component of the content management system 100 can notify the creator of the content post that a media file has not been transmitted, or that a media file or the current content post in general has failed to satisfy the content management system's moderation guidelines. The creator/user may be provided with the opportunity to change the content post, resubmit a media file, or otherwise bring the content post and/or media files into conformance with the guidelines.

At block 618, the content post generator 110 or some other module or component of the content management system 100 can make the content post unavailable for distribution by the content post distributor 112. For example, the content post may be marked as unavailable in the content post data store 120, or the content post may be deleted from the content post data store 120.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a computer-readable memory storing executable instructions; and
one or more processors in communication with the computer-readable memory, the one or more processors programmed by the executable instructions to at least:
generate media file transmission information uniquely associated with a media file of a content post, wherein the media file transmission information comprises a network address of a transmission location for the media file, and wherein the content post is generated on a user computing device;
transmit the media file transmission information to the user computing device;
receive, at the transmission location, at least a first portion of the media file from the user computing device;
receive the content post from the user computing device; and
receive, at the transmission location, at least a second portion of the media file from the user computing device subsequent to receiving the content post from the user computing device.

2. The system of claim 1, wherein the media file comprises at least one of: an image, a video, an audio recording, an animation, or a document.

3. The system of claim 1, wherein the media file transmission information further comprises an identifier representing at least one of: a user, the content post, the user computing device, an application executing on the user computing device, or the media file.

4. The system of claim 1, wherein the one or more processors are further programmed by the executable instructions to at least receive, from the user computing device, a request for the media file transmission information over a first connection, wherein the content post is received from the user computing device over a second connection different than the first connection.

5. The system of claim 1, wherein the one or more processors are further programmed by the executable instructions to at least:
determine a degree to which at least one of the content post or the media file satisfy a content policy; and
determine, based at least partly on the degree to which the at least one of the content post or the media file satisfy the content policy, to make the content post available for distribution.

6. The system of claim 1, wherein the one or more processors are further programmed by the executable instructions to at least:
determine that the media file has been successfully received at the transmission location; and
determine to make the content post available for distribution based at least partly on the media file being successfully received.

7. The system of claim 1, wherein the one or more processors are further programmed by the executable instructions to at least:
determine that the media file has been successfully received at the transmission location; and
determine to reject transmission of a second media file to the transmission location in response to determining that the media file has been successfully received at the transmission location.

8. The system of claim 1, wherein the one or more processors are further programmed by the executable instructions to at least:
determine that the media file has not been successfully received at the transmission location; and
generate a modified version of the content post based at least partly on the media file not being successfully received.

9. The system of claim 8, wherein the executable instructions to generate the modified version of the content post comprise executable instructions to alter a format of the content post.

10. The system of claim 8, wherein the executable instructions to generate the modified version of the content post comprise executable instructions to replace the media file with a placeholder in the content post.

11. A computer-implemented method comprising:
as performed by a content management system comprising one or more computing devices configured to execute specific instructions,
generating media file transmission information uniquely associated with a media file of a content post, wherein the media file transmission information comprises a network address of a transmission location for the media file, and wherein the content post is generated on a user computing device;
transmitting the media file transmission information to the user computing device;
receiving, at the transmission location, at least a first portion of the media file from the user computing device;
receiving the content post from the user computing device; and
receiving, at the transmission location, at least a second portion of the media file from the user computing device subsequent to receiving the content post from the user computing device.

12. The computer-implemented method of claim 11, further comprising:
analyzing the media file based at least partly on a content policy of the content management system; and
determining to make the content post available for distribution based at least partly on analyzing the media file.

13. The computer-implemented method of claim 11, further comprising:
determining that the media file has been successfully received at the transmission location; and
determining to make the content post available for distribution based at least partly on the media file being successfully received.

14. The computer-implemented method of claim 11, further comprising:
- determining that the media file has not been successfully received at the transmission location; and
- generating a modified version of the content post based at least partly on the media file not being successfully received.

15. The computer-implemented method of claim 14, wherein determining that the media file was not successfully receives is based on at least one of: occurrence of a timeout event, or receipt of a failure notification from the transmission location.

16. The computer-implemented method of claim 14, wherein generating the modified version of the content post comprises altering a format of the content post.

17. The computer-implemented method of claim 14, wherein generating the modified version of the content post comprises replacing the media file with a placeholder in the content post.

18. The computer-implemented method of claim 11, further comprising determining to reject transmission of a second media file to the transmission location based at least partly on expiration of second media file transmission information uniquely associated with the second media file.

19. The computer-implemented method of claim 11, further comprising generating data, associated with the content post, indicating that receipt of the media file is pending.

20. The computer-implemented method of claim 11, further comprising:
- establishing a first connection with the user computing device;
- receiving at least a portion of the media file using the first connection;
- establishing a second connection with the user computing device, wherein the second connection is separate from the first connection; and
- receiving at least a portion of the content post over the second connection in parallel with receiving the portion of the media file using the first connection.

* * * * *

UNITED STATES PATENT AND TRADEMARK OFFICE
CERTIFICATE OF CORRECTION

| | | |
|---|---|---|
| PATENT NO. | : 10,893,091 B2 | Page 1 of 1 |
| APPLICATION NO. | : 16/393672 | |
| DATED | : January 12, 2021 | |
| INVENTOR(S) | : Sohrab Andaz | |

It is certified that error appears in the above-identified patent and that said Letters Patent is hereby corrected as shown below:

In the Claims

In Column 17, Line 10 (approx.), Claim 15, delete "receives" and insert --received--.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*